United States Patent [19]

Gebhart

[11] 4,156,308

[45] May 29, 1979

[54] METHOD OF MAKING A DECORATIVE ARTICLE FROM PINE NEEDLES

[76] Inventor: Helen L. Gebhart, Rte. 3, Box 185, Lumberton, Miss. 39455

[21] Appl. No.: 898,524

[22] Filed: Apr. 20, 1978

[51] Int. Cl.$^{2}$ .......................... B23P 3/00; B23P 19/04

[52] U.S. Cl. .......................................... 29/460; 2/192; 2/209.3; 28/143; 147/48; 428/35; 112/262.1

[58] Field of Search .................... 29/428, 460; 147/48; 428/35; 2/192, 209.3; 112/262; 28/143

[56] References Cited

U.S. PATENT DOCUMENTS

| | | | |
|---|---|---|---|
| 64,145 | 4/1867 | Richards | 2/192 |
| 184,237 | 11/1876 | Gensch | 147/48 |
| 191,647 | 6/1877 | Brown | 112/262 X |
| 1,683,507 | 9/1928 | Weber | 147/48 |
| 2,267,723 | 12/1941 | Exl | 2/192 |
| 2,641,299 | 6/1953 | Bloom et al. | 428/35 X |
| 2,962,802 | 12/1960 | Pierson | 29/460 X |
| 3,563,292 | 2/1971 | Gordon | 147/48 |
| 3,674,187 | 7/1972 | Catugno | 29/428 X |
| 3,707,033 | 12/1972 | Knott | 29/460 |
| 4,112,573 | 9/1978 | Maye | 29/428 |

*Primary Examiner*—Charlie T. Moon
*Attorney, Agent, or Firm*—Clarence A. O'Brien; Harvey B. Jacobson

[57] ABSTRACT

A method of making a basket-like or other decorative article from pine needles comprising the steps of twisting and arranging pine needles, stitching the pine needles with a sewing needle and thread, so as to form a surface or wall, forming a basket-like object, the outer and inner surfaces of which are sealed with a protective coating, such as varnish.

10 Claims, 9 Drawing Figures

Fig.1
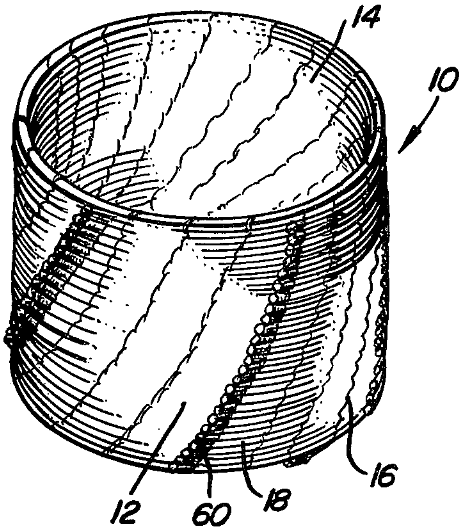
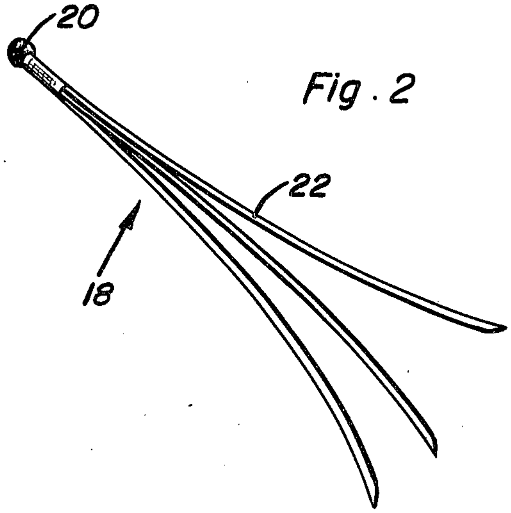
Fig. 2
Fig. 3
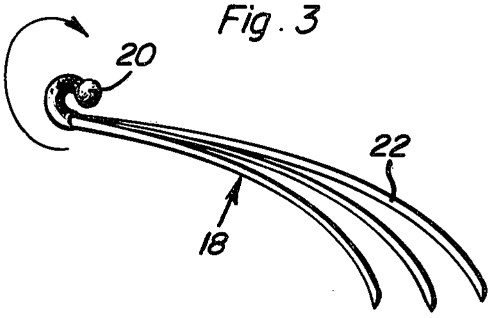
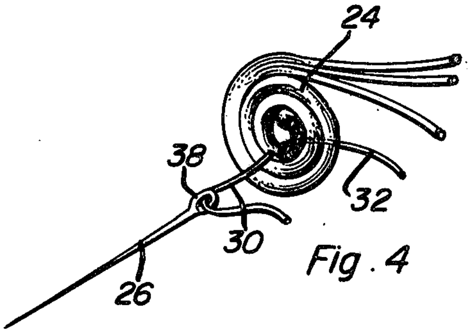
Fig. 4
Fig. 5
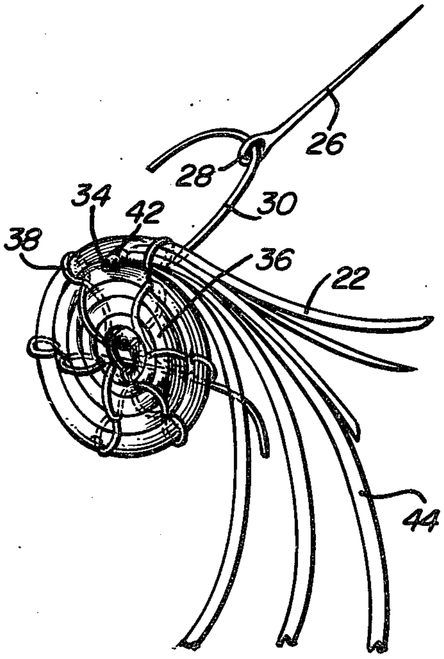

METHOD OF MAKING A DECORATIVE ARTICLE FROM PINE NEEDLES

BACKGROUND OF THE INVENTION

1. Field of the Invention

The invention relates to a decorative article made from pine needles, more specifically, to a basket prepared by shaping, arranging and stitching a plurality of fresh green long leaf pine needles into a surface and walls forming the bottom and sides of a decorative article. The shape and condition of the object is preserved by coating with a protective varnish, and optional decorative braiding or a handle can be applied.

2. Description of the Prior Art

Methods for producing basket-like objects are known.

Lloyd in U.S. Pat. No. 1,298,230 produces wover reed articles, but fails to disclose use of pine needles, or use of a stitching technique, rather than a weaving technique. Woven articles are also disclosed by Larsen in U.S. Pat. No. 1,810,969, and by Brody in U.S. Pat. No. Des. 235,420. Morris in U.S. Pat. No. 928,266 describes use of vegetable fibers, such as hay, straw or grass for preparation of a cord by passing the fibers through a bath of adhesive material, but fails to disclose specifically use of pine needles or a stitching technique.

SUMMARY OF THE INVENTION

It is an object of the present invention to utilize readily obtainable materials, such as fresh, green, long leaf pine needles, sewing needle and thread and a protective varnish to produce a useful decorative article.

Another object of the invention is to provide decorative articles in various shape, such as round, oblong, square, or other shapes.

Still another object of the invention is to provide decorative articles with inwardly or outwardly flaring sides.

Yet another object of the invention is to provide decorative articles having handles attached thereto.

Still another object of the invention is to provide a method for affixing decorative embellishment, such as braiding, ropes, or the like to a decorative article.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTIVE OF THE DRAWINGS

FIG. 1 is a perspective view of a round basket comprising one embodiment of the present invention.

FIG. 2 is a perspective view of a single pine needle, from which construction of the present invention is begun.

FIG. 3 is a perspective view of the pine needle of FIG. 2, showing initial twisting of the head of the pine needle.

FIG. 4 is a perspective view of the pine needle of FIG. 3 after twisting to form a spiral and insertion of a threaded sewing needle.

Fig. 5 is a perspective view showing insertion of a second pine needle and stitching around the edges of the spiral formed therefrom.

DESCRIPTION OF THE PREFERRED EMBODIMENT

Figure 6:
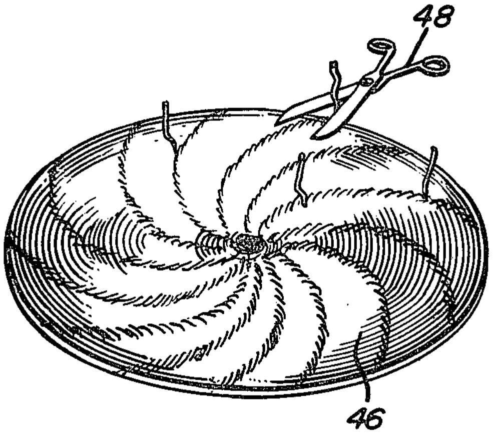
FIG. 6 is a perspective view of a completed disc forming the bottom of a decorative article of the present invention, showing trimming of loose threads of straw.

The article of the present invention, such as a basket, designated generally by the numeral 10 has a side wall having an outer surface 12 and an inner surface 14. Stitching of thread 16 holds individual pine needles 18 having heads 20 and straw 22. Pine needle 18 can be derived from one of many species of pine, and a needle can have two, three or five straws 22, depending upon the species employed. Preferably, each pine needle 18 will have 3 straws 22 joined at head 20, although other species having a different number of straws 22 in each needle 18 can be successfully used to practice the present invention and the pine needles 18 must be fresh and green and substantially flexible so they can be shaped, rolled or twisted without breaking.

Figure 7:
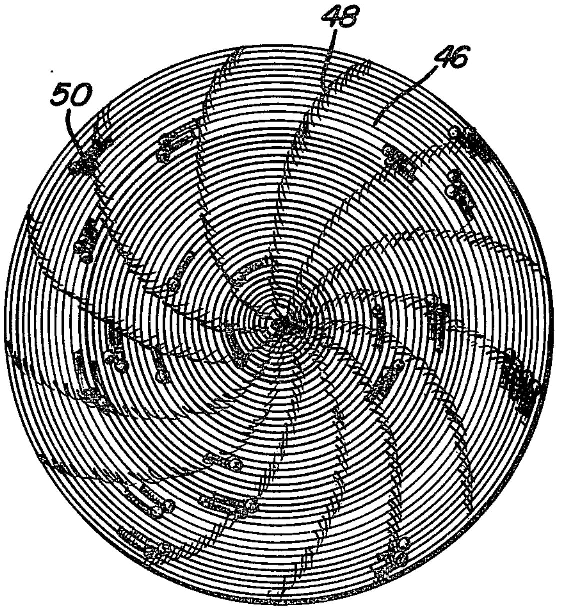
FIG. 7 is a bottom plan view of the completed disc of FIG. 6.

The first step in the method of the present invention consists of twisting pine needle 18 about its head 20, as shown in FIG. 3. Twisting or rolling of the pine needle head 20 toward the free ends of the straws 22 is continued until spiral 24 is formed, as in FIG. 4. Sewing needle 26 with eye 28 and thread 30 passing through eye 28 is inserted near the center of spiral 24, and thread 30 drawn partially through spiral 24, as shown in FIG. 4. Thread 30 is grasped on the side of spiral 24 remote from sewing needle 26, namely near point 32, and stitches are formed radially about the spiral 24 to form a plurality of stitches about the center of augmented spiral 34 in FIG. 5. Radial stitches 36 are shown, formed in the manner described above. Peripheral stitches 38 are formed by twisting augmented spiral 34 to incorporate additional pine needles, such as pine needle 40 having head 42 and straw 44. Sewing needle 26 is shown in FIG. 5 with thread 40 in the process of stitching straw 22 from pine needle 18 and straw 44 from pine needle 40. Spiral 34 is then rotated counterclockwise and additional stitches and additional pine needles are added to finally form the disc 46 of FIG. 6. Disc 46 can form the bottom portion of a circular basket 14, or can be used otherwise. Loose ends of threads and straws can be clipped, as shown in FIG. 6 by scissors 48. Disc 46, as well as constituting the bottom portion of basket 14, is also useful in an of itself, as, for example, a coaster, place mat, article for holding hot dishes, or other uses. A bottom view of disc 46 in FIG. 7 shows a pattern of stitches 48 trailing outward spirally, a pattern which is achieved by stitching peripheral stitches 38 in regular fashion about the periphery of spiral 34. Other decorative patterns of forming stitches 48 can be formed by locating peripheral stitches 38 appropriately. Furthermore, heads 50 of inserted pine needles can be inserted into spiral 34 in a manner to form decorative patterns, and complex relationships between patterns formed from stitches 48 and from heads 50 of inserted pine needles create a wide variety of decorative designs.

Figure 8:
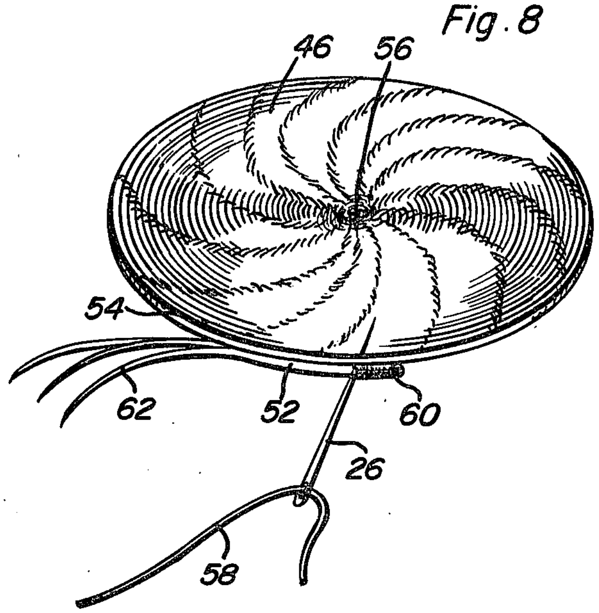
FIG. 8 shows the initial formation of a cylindrical side wall by stitching of a pine needle to the disc of FIG. 7.

When disc 46 is used to form the bottom portion of a circular basket 10, side pine needle 52 is placed about the periphery 54 of disc 46 equi-distant from axis 56 of disc 46. Sewing needle 26 threaded with thread 58 is passed through head 60 of side pine needle 52 and then through periphery 54 of disc 46, as shown in FIG. 8. Thread 58 is drawn partially through head 60 of side pine needle 52 and disc 46, the end of thread 58 is grasped, and straw 62 of side pine needle 52 is stitched, along with additional side pine needles in the same manner, by turning disc 46 and forming a basket-like article. Stitches 16 of side pine needles can be located so as to form a regular pattern, and heads 60 of side pine needles can also be located so as to form a regular pattern. Loose ends of threads and loose ends of straw along the sides of the completed object are clipped with scissors 48. To avoid a lopsided basket, the last row of side pine needles is stitched in the location determined to be lowest.

Figure 9:
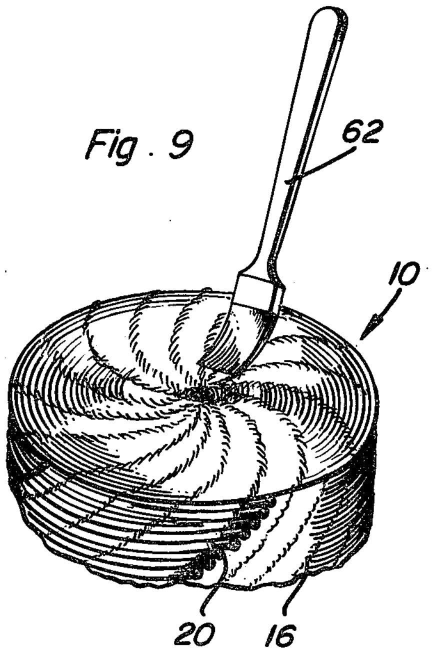
FIG. 9 shows application of a protective varnish to the completed article of the invention.

Green pine needles must be used for their inherent flexibility. In practice, green pine straw begins to dry and shrink within a short time after separation from a tree when exposed to the atmosphere. The pine needles also change from a green color to a brownish color as they dry and cure and, of course, become brittle. An article formed according to the steps outlined above must be preserved to prevent natural shrinking of the green pine needles used in its assembly, to avoid undesirable loosening of the stitching and disassembly of the article. Consequently, a protective coating of varnish, such as polyurethane varnish, is applied to article 10 before the deleterious effects of shrinkage have occurred. Polyurethane varnish is applied in FIG. 9 by brush 62 throughout the outer surface of the basket, preferably in a quantity sufficient to feel by hand the varnish on the inside of article 10. Article 10, now coated with varnish on its outer surface, is supported in a well ventilated area in a manner to allow access of air to all outside and inside surfaces of article 10. Preferably, article 10 is supported upright on two sticks or supports outdoors in the sunshine. Varnish is applied about the inside surface of article 10 with brush 62 to sealingly cover all surfaces of stitches and pine needles comprising article 10. As the varnish dries, article 10 is moved occasionally to avoid bounding to the supports. Under the conditions described, varnish on article 10 dries in a few hours, preventing the natural shrinkage of unprotected pine needles comprising article 10. Preserved pine needles in article 10 change color from green to brown in about five days if placed in outdoor sunshine each day. Slow change of color from green to brown occurs indoors for about one year.

Other shapes of article than the embodiment depicted in the drawings can be made by following a slight variation in the steps outlined above. To manufacture a basket-like decorative article having flared sides, the straw of side pine needles is pulled outwardly as stitching of the sides proceeds. If the outward flare is extreme and stitches become far apart, an extra row of stitches is inserted. Inward flaring of sides is accomplished by pressing straw of side pine needles inwardly as stitching of the sides of the decorative article proceeds. A square mat is constructed by forming spiral 34 in FIG. 5 in the manner described above. Spiral 34 is squeezed at four equidistant points on its outer edge to form four corners. One such corner is located near head 42 of pine needle 40, and three additional pine needles are placed having their heads near the other three corners. Straw for the four pine needles so placed is stitched while squeezing at each corner to preserve the square form so begun. The square mat is rotated and stitching continued to the desired size. Loose ends of threads and straw can be clipped, completing the square mat. After sealing with varnish in the manner described above for a circular mat, the square mat can be used by itself. Alternatively, the unvarnished mat can form the basis for the bottom of a square basket. To form the sides of such a square basket from a square mat, side pine needles are alternately added and stitched to the edge of the square mat to form a square basket with corners. Each time the stitching carries around a corner, the pine needles are squeezed as the corners are formed to keep the corners square. When the square basket has been formed at the desired height, varnish is sealingly applied to the inner and outer surfaces of the square basket, as described above in the case of a circular basket and the varnish is allowed to dry similarly.

Trim can be applied in decorative fashion to objects formed according to the invention by forming braid, knots, rope, handles or trays from pine needles, such trim can be applied by stitching to the outer or inner surfaces of a decorative article, such as a circular or square basket, formed in the manner described above. To form a braid, thread is wound about ten times around the base of the heads of six pine needles, tied into a knot and clipped. Straws from the six pine needles are separated into three groups, and each of the three groups is tied by winding thread over the ends and cutting. Straws are trimmed to approximately equal lengths. Braiding is best accomplished with help from an assistant to hold the end comprising tied heads of the six pine needles, while the three bundles are braided by passing alternately the outer bundle over the center bundle. When the length of bundles has been converted to braiding, the braid is stitched to the basket for decoration, preferably around the top, bottom, or middle. To form knots, the head is removed from three long pine needles and single knot tied near the end, and knots are tied along the length of the needle. The knotted straws are stitched to the basket as a decoration. To form decorative rope, six pine needles are wrapped with thread and additional needles added as desired. Ends are formed by winding thread in place about ten times, tying and cutting excess threads and excess straw. Such rope can be crimped and stitched to the decorative article. Simple loops or figure eight loops can be formed from the decorative rope and stitched to the article. An example of a handle can be formed as follows: nine pine needles are tied together, wound with thread, and stitched at each end to the article. Alternatively, a rope can be formed, as described above, for forming decorative trim, and attached by stitching to the article, Knobs can be formed on lids of objects from pine needles formed in the shape of a disc, or alternatively from pine cones, driftwood, a bead, or a plastic ring. To install a pine cone or driftwood to an article lid, a round disc of thin wood or plastic can be placed inside the lid, centered, and attached to the pine cone or driftwood located on the opposite side of the lid.

An article in the shape of an oblong basket can be formed as an alternative to the round and square baskets made by the method described above by altering the initial steps. Instead of forming a circular spiral, as shown in FIGS. 3, 4 and 5, an oblong spiral is begun by starting with a plurality of pine needles, such as about nine pine needles, winding thread around the base of the heads of the pine needles about ten times, and tieing into a knot. The thread is then wound down the length of the straw of the pine needles, spacing at a distance of about three inches. The thread is then wound in place about ten times and a knot tied. Excess threads and pine straw is clipped, forming matching ends. An oblong is then formed by stitching about the periphery, as shown for a circular spiral in FIG. 5. An oblong mat can be formed of any desired size and sides, with flaring if desired, formed in the manner described above for baskets of circular cross section. When formed, the article is covered with varnish in the manner described above, and decorative trim can be applied.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method of making a decorative article from thread and a plurality of fresh pine needles, each pine needle having a head joining the ends of a plurality of straws, comprising the steps of:
   (a) twisting a pine needle spirally about its head to form a spiral having a plurality of turns and having an edge;
   (b) inserting a sewing needle threaded with said thread near the center of said spiral;
   (c) drawing said thread partially through said spiral;
   (d) grasping said thread on the side of said spiral remote from the sewing needle;
   (e) stitching with said sewing needle radially outwardly of said spiral to form a plurality of stitches which meet;
   (f) alternately turning said spiral, incorporating additional pine needles about the edge of said spiral, and stitching said additional straw to said spiral to form an augmented spiral;
   (g) repeating the preceding step a plurality of times to form a disc having an axis and a periphery located equidistant from said axis.

2. The method of claim 1 together with the additional steps of:
   (a) sealingly applying a protective coating to said disc;
   (b) allowing said disc to dry.

3. The method of claim 1 together with the additional steps of:
   (a) placing a side pine needle comprising one of said fresh pine needles contactingly above and parallel to the periphery of said disc and approximately equal distance from the axis of said disc;
   (b) inserting said sewing needle, threaded with said thread, through the head of said side pine needle and then through the periphery of said disc;
   (c) drawing said thread partially through said side pine needle head and disc;
   (d) grasping said thread;
   (e) alternately stitching with said sewing needle the straw of said side pine needle and additional side pine needles, and turning said disc having attached side pine needles to form a basket-like decorative article.

4. The method of claim 3 together with the additional steps of:
   (a) sealingly applying a protective coating comprising varnish to said basket-like decorative article;
   (b) allowing said article to dry.

5. The method of claim 4 wherein said basket-like decorative article is flared outwardly.

6. The method of claim 4 wherein said basket-like decorative article is flared inwardly.

7. The method of claim 1 together with the additional steps of:
   (a) squeezing four equidistant points on said periphery to form four corners;
   (b) placing in sequence the head of four additional pine needles at said four corners, and stitching the straw of said four additional pine needles while squeezing at each corner;
   (c) repeating the preceding step to form a square mat having an edge.

8. The method of claim 7, together with the additional steps of:
   (a) placing a side pine needle comprising one of said fresh pine needles contactingly along and parallel to the edge of said square mat, the head of said side pine needle contacting one of said corners;
   (b) inserting said sewing needle, threaded with said thread, through the head of said side pine needle and then through the edge of said disc near said corner;
   (c) drawing said thread partially through said side pine needle and edge;
   (d) grasping said thread;
   (e) alternately stitching with said sewing needle the straw of said side pine needle and additional side pine needles, each of said additional side pine needles being on a line perpendicular to said mat passing through one of said four corners, forming a square basket having side corners, squeezing said side pine needles as said side corners are formed;
   (f) sealingly applying a protective coating comprising varnish to said square basket; and
   (g) allowing said square basket to dry.

9. The method of claim 5, together with the additional step of attaching a handle thereto.

10. The method of claim 5, together with the additional step of attaching decorative braiding thereto.

* * * * *